United States Patent
Kim

(10) Patent No.: US 8,929,879 B2
(45) Date of Patent: Jan. 6, 2015

(54) METHOD AND APPARATUS FOR CONTROLLING OPERATION MODE OF FEMTOCELL BASE STATION

(75) Inventor: Jun Sik Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 338 days.

(21) Appl. No.: 12/837,878

(22) Filed: Jul. 16, 2010

(65) Prior Publication Data

US 2011/0143763 A1 Jun. 16, 2011

(30) Foreign Application Priority Data

Dec. 15, 2009 (KR) .................. 10-2009-0124582

(51) Int. Cl.
- *H04W 4/00* (2009.01)
- *H04W 72/12* (2009.01)
- *H04W 84/04* (2009.01)
- *H04W 88/08* (2009.01)

(52) U.S. Cl.
CPC ........ *H04W 72/1231* (2013.01); *H04W 84/045* (2013.01); *H04W 88/08* (2013.01)
USPC ........ 455/422.1; 455/450; 455/423; 455/424; 455/501; 455/63.1

(58) Field of Classification Search
USPC .............. 455/422.1, 450, 423, 424, 501, 63.1
See application file for complete search history.

(56) References Cited

U.S. PATENT DOCUMENTS

| | | |
|---|---|---|
| 2009/0005099 A1 | 1/2009 | Jung et al. |
| 2009/0109939 A1 | 4/2009 | Bhushan et al. |
| 2009/0129259 A1* | 5/2009 | Malladi et al. ................ 370/210 |
| 2009/0131049 A1 | 5/2009 | Osborn |
| 2010/0048221 A1* | 2/2010 | Yavuz et al. ............... 455/452.2 |
| 2011/0069660 A1* | 3/2011 | Lin et al. ....................... 370/328 |
| 2011/0116480 A1* | 5/2011 | Li et al. ......................... 370/332 |
| 2012/0077486 A1* | 3/2012 | Park et al. .................. 455/422.1 |

FOREIGN PATENT DOCUMENTS

| | | |
|---|---|---|
| KR | 1020090006711 | 1/2009 |
| KR | 1020090049389 | 5/2009 |
| KR | 1020090108149 | 10/2009 |
| KR | 1020090123132 | 12/2009 |
| WO | 2009/149431 A1 | 12/2009 |

* cited by examiner

*Primary Examiner* — Justin Lee
(74) *Attorney, Agent, or Firm* — Nelson Mullins Riley & Scarborough LLP; Anthony A. Laurentano, Esq.; Dipti Ramnarain, Esq.

(57) ABSTRACT

A method for controlling an operation mode of a femtocell base station includes receiving a channel quality indicator of a downlink channel between the femtocell base station and a terminal, which is transmitted from the terminal; calculating a communication quality between the femtocell base station and the terminal based on the channel quality indicator; determining whether or not an interference factor has occurred in communication between the femtocell base station and the terminal based on the communication quality; and changing or maintaining an operation mode of the femtocell base station based on the determination result. The communication quality may be calculated when the operation mode of the femtocell base station is allowed to be changed.

16 Claims, 4 Drawing Sheets

METHOD AND APPARATUS FOR CONTROLLING OPERATION MODE OF FEMTOCELL BASE STATION

CROSS-REFERENCE(S) TO RELATED APPLICATIONS

The present invention claims priority of Korean Patent Application No. 10-2009-0124582, filed on Dec. 15, 2009, which is incorporated herein by reference.

FIELD OF THE INVENTION

The present invention relates to a method and apparatus for controlling an operation mode of a femtocell base station; and, more particularly, to a method and apparatus for changing an operation mode of a femtocell base station if it is determined that an interference factor has occurred in a communication between the femtocell base station and a terminal based on a quality of the communication calculated using a channel quality indicator which the femtocell base station receives from the terminal.

BACKGROUND OF THE INVENTION

Recently, as a demand for a high-speed and large-capacity service has increased, a mobile communication technology has developed to offer wireless data services of a high communication capacity, e.g., a 3rd generation partnership project (3GPP) long term evolution (LTE) mobile communication system. For this technology, there has been proposed a femtocell to provide communication services for a few subscribers located at home or an office.

While a macrocell is a service area covered by one base station in the existing cellular mobile communication, the femtocell covers much smaller area compared with that of the macrocell. In general, a femtocell base station which covers a femtocell may be a mini base station located indoors such as in home or an office, unlike a macro base station which covers a macrocell. Such a femtocell base station connects with the existing networks to not only provide inexpensive and various services with high-speed and large-capacity data communication but also achieve an expansion of a mobile communication service area, an improvement of a service quality and an increase of capacity of the mobile communication base station.

For example, a femtocell base station covering an area of about 10~20 meter radius is located indoors to be connected to a wired IP network, thus providing wired/wireless communication through a mobile phone or various services associated with a home network. In addition, data can be transmitted from the femtocell base station to a switching device without a separate indoor relay, thereby reducing costs of establishing such a network.

Here, the femtocell base station can support a closed subscriber group (CSG) which allows connection only for an authorized user group. The femtocell covered by this femtocell base station is assigned a CSG identifier (ID) which is a unique ID and is called a CSG cell.

Furthermore, the femtocell base station can be operated in an open user access mode, a closed user access mode, and a mixed user access mode. In the open user access mode, a service may be allowed for all terminals regardless of their subscription to CSG and, in the closed user access mode, a service may be provided only for CSG subscribers. Further, in the mixed user access mode, CSG subscribers may be provided with a closed type service and CSG non-subscribers may be provided with in an open type service, thus offering differentiated services to each group.

Meanwhile, since users may install and operate femtocells for themselves, chances are that femtocell base stations can be established in an unplanned manner depending on the users' needs without considering a cell design by a service provider. Therefore, if a lot of femtocells are installed in a limited area, severe interference may be caused between the femtocell base stations. In addition, in case where a femtocell base station is operated in a closed user access mode, any non-subscriber terminals cannot receive services from the femtocell base station, and would request services to another femtocell base station or a macrocell base station which may be relatively far away. This may cause a considerable interference factor in the communication between the femtocell base station and other terminals.

As mentioned above, it is preferable to install a femtocell base station without causing any interference with adjacent base stations including a macro base station existing outdoors. Particularly, in case where a femtocell base station is operated in the closed user access mode, it is necessary to ensure a service quality of a subscriber terminal while minimizing interferences caused by a non-subscriber terminal.

SUMMARY OF THE INVENTION

It is, therefore, an object of the present invention to provide a method and apparatus for controlling an operation mode of a femtocell base station, by considering current communication resources when it is determined that, if a communication quality calculated by using a channel quality indicator (CQI) received from a terminal connected to the femtocell base station is considerably deteriorated at a given point of time, the communication quality is deteriorated due to the request of service of a non-subscriber terminal.

In accordance with an aspect of the present invention, there is provided a method for controlling an operation mode of a femtocell base station, the method including: receiving a channel quality indicator of a downlink channel between the femtocell base station and a terminal, which is transmitted from the terminal; calculating a communication quality between the femtocell base station and the terminal based on the channel quality indicator; determining whether or not an interference factor has occurred in communication between the femtocell base station and the terminal based on the communication quality; and changing or maintaining an operation mode of the femtocell base station based on the determination result.

In accordance with another aspect of the present invention, there is provided an apparatus for controlling an operation mode of a femtocell base station, the apparatus including: a channel information receiving unit for receiving a channel quality indicator of a downlink channel between the femtocell base station and a terminal, which is transmitted from the terminal; a communication quality calculating unit for calculating a communication quality between the femtocell base station and the terminal based on the channel quality indicator; a mode change determining unit for determining whether or not an interference factor has occurred in communication between the femtocell base station and the terminal based on the communication quality; and a mode setting unit for changing or maintaining an operation mode of the femtocell base station based on the determination result.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENT

Hereinafter, an embodiment of the present invention will be described in detail with the accompanying drawings.

Figure 1:
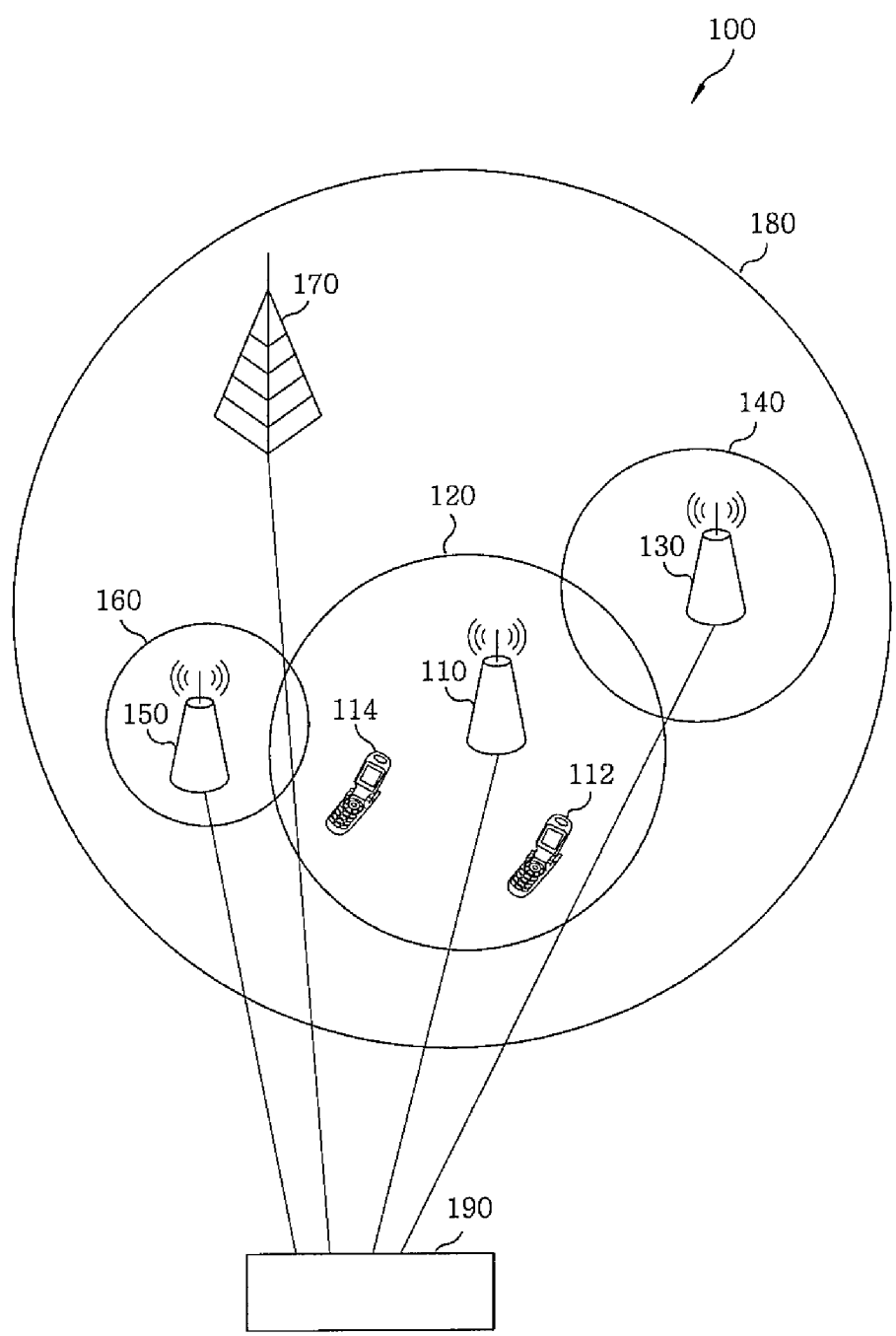
FIG. 1 is a view schematically illustrating a structure of a mobile communication system in accordance with an embodiment of the present invention.

FIG. 1 is a view schematically illustrating the structure of a mobile communication system in accordance with an embodiment of the present invention.

Referring to FIG. 1, a mobile communication system 100 includes a femtocell base station 110 covering a femtocell 120, a subscriber terminal 112 having subscribed to a femtocall service provided by the femtocell base station 110, and a non-subscriber terminal 114 not having subscribed to the femtocell service.

In addition, when the femtocell base station 110 is newly installed, it can be installed around femtocells 140 and 160 covered by existing femtocell base stations 130 and 150. Meanwhile, in the mobile communication system 100, the femtocell base stations 110, 130 and 150 can be located within a macrocell 180 covered by a macro base station 170. Here, the macro base station 170 and the femtocell base station 110 may be node-B (eNB) and home evolved node-B (HeNB) in the 3GPP LTE mobile communication system, respectively.

As shown in FIG. 1, the femtocell base station 110 can acquire information as to the femtocell base stations 130 and 150 that cover the adjacent fembocells 140 and 160 from the terminals 112 and 114 within the femtocell 120 covered by the femtocell base station 110, the adjacent femtocell base stations 130 and 150, or the macro base station 170. In addition, the operation mode of the femtocell base station 110 can be changed or maintained based on a channel quality indicator (CQI) of a downlink channel and a magnitude of signal which are transmitted from the terminals 112 and 114, to which the femtocell base station 110 can provide services, through an uplink channel, thereby enabling a dynamic operation. Base stating information about the femtocell base station 110, including its operation mode, is transmitted to an operation, administration and management (OAM) apparatus so that they can be used for administering a mobile communication network established by the mobile communication system 100.

Meanwhile, referring to FIG. 1, if the operation mode of the femtocell base station 110 is a closed user access mode, when the non-subscriber terminal 114 is calling or trying to call within the femtocell 120 covered by the femtocell base station 110, the non-subscriber terminal 114 in the femtocell 120 cannot receive a service. Therefore, the non-subscriber terminal 114 increases power of a transmitted/received signal to request a service to other femtocell base stations 130 and 150 or the macro base station 170 which are relatively far away and, then, severe interference may occur in communication between the femtocell base station 110 and the subscriber terminal 112. In this case, the operation mode of the femtocell base station 110 is changed to a mixed user access mode which also provides a service to the non-subscriber terminal 114. As mentioned above, if the dynamic operation which enables the operation mode of the femtocell base station 110 to be changed is permitted by the service provider, properly changing the operation mode of the femtocell base station 110 prevents a service for the subscriber terminal 112 from being interrupted by the non-subscriber terminal 114.

Further, referring to FIG. 1, after the operation mode of the femtocell base station 110 is changed to the mixed user access mode as above, the operation mode of the femtocell base station 110 is changed to an idle mode state or maintained based on considering whether or not the quality of service (QoS) required by the subscriber terminal 112 can be maintained and whether or not communication resources assigned to the femtocell base station 110 can be shared. If there is no terminal which requests a service to the femtocell base station 110, the operation mode thereof is transited to the idle mode state.

Figure 2:
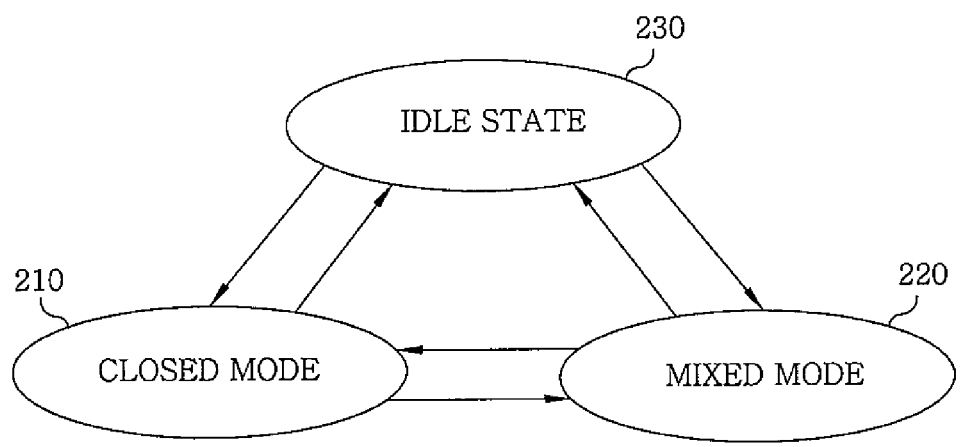
FIG. 2 shows a state transition diagram of an operation mode of a femtocell base station in accordance with the embodiment of the present invention.

FIG. 2 shows a state transition diagram of the operation mode of the femtocell base station in accordance with the embodiment of the present invention.

Referring to FIG. 2, while the femtocell base station 110 operates in a closed user access mode 210, a communication quality is calculated based on information about surrounding wireless environment of the femtocell base station 110 such as CQI received from the subscriber terminal 112 or the magnitude of signal transmitted therefrom through an uplink channel. Also, if it is determined that a severe interference factor has occurred between the femtocell base station 110 and the subscriber terminal 112 based on the calculated communication quality, the state of the femtocell base station 110 is transited to the mixed user access mode 220.

Meanwhile, if there is no terminal connected to the femtocell base station 110 that operates in the closed user access mode 210 or the mixed user access mode 220, the femtocell base station is transited to the idle state 230 to send only the broadcast information, which is periodically sent by the femtocell base station 110, in an even slower cycle than a standard cycle, and waits until there is a request for service to the femtocell base station 110. When there is a request for service to the femtocell base station 110, the state thereof is transited to the closed user access mode 210 or the mixed user access mode 220.

Figure 3:
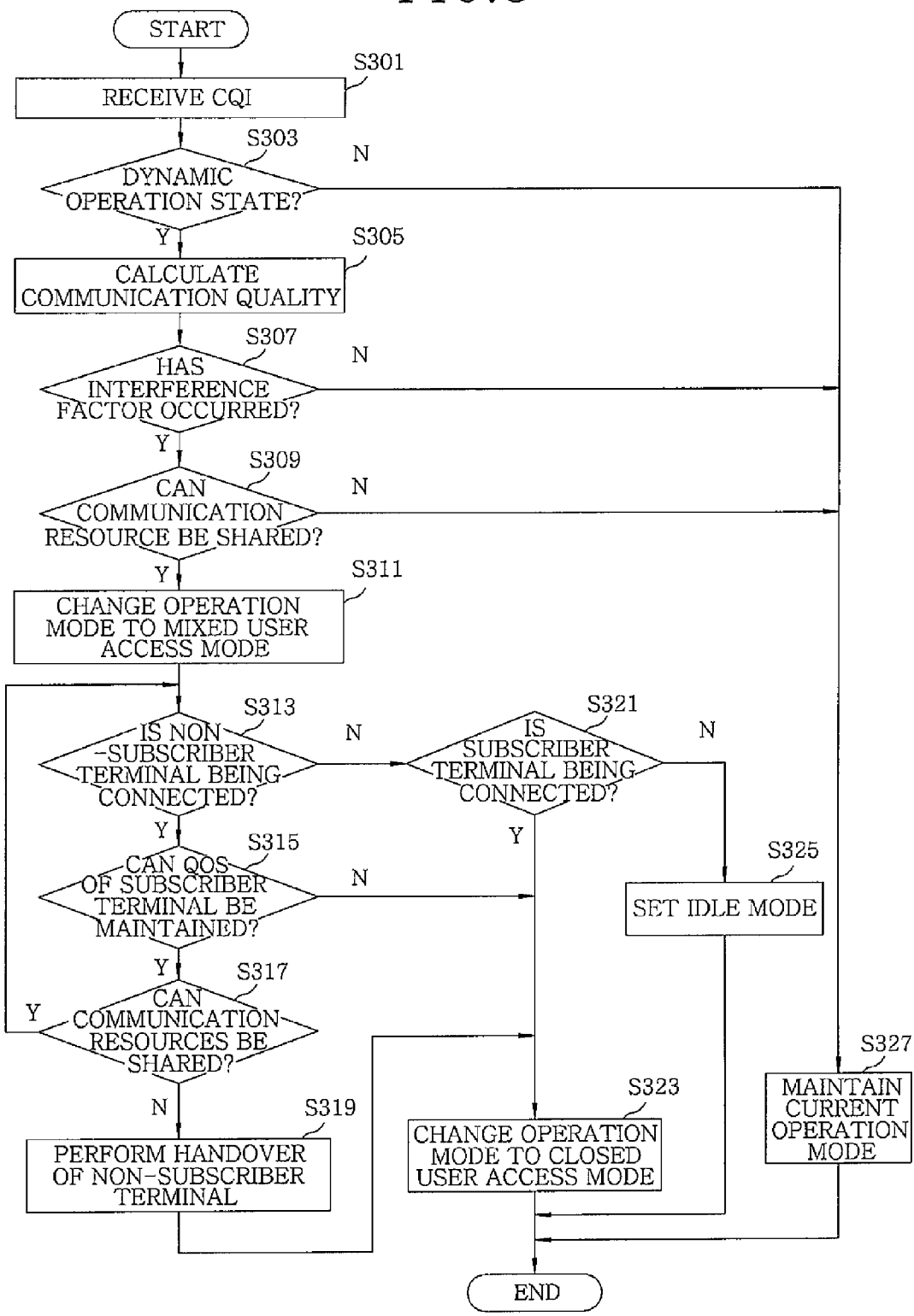
FIG. 3 is a flowchart illustrating a procedure of controlling an operation mode of a femtocell base station in accordance with the embodiment of the present invention.

FIG. 3 is a flowchart illustrating a procedure of controlling an operation mode of the femtocell base station in accordance with the embodiment of the present invention.

Referring to FIG. 3, first, CQI of the downlink channel between the terminal 112 and the femtocell base station 110 that operates in the closed user access mode is received from the terminal 112 in step S301.

Then, in step S303, it is checked that the dynamic operation that enables the operation mode of the femtocell base station 110 to be changed is permitted. If the dynamic operation is not available, the operation mode of the femtocell base station 110 is maintained in the current state in step S327.

If the dynamic operation is available, a communication quality between the femtocell base station 110 and the terminal 112 is calculated based on the CQI in step S305. Meanwhile, the communication quality can be calculated by taking into consideration the CQI as well as a magnitude of signal transmitted from the terminal 112 through the uplink channel.

Next, in step S307, it is determined whether or not an interference factor has occurred in the communication between the femtocell base station 110 and the terminal 112 based on the communication quality. If it is determined that the interference factor has not occurred, the operation mode of the femtocell base station 110 is maintained in the current state in step S327.

If it is determined that the interference factor has occurred in the communication between the femtocell base station 110 and the terminal 112, it is determined whether or not communication resources assigned to the femtocell base station 110 can be shared in step S309. If it is determined that the communication resources cannot be shared, the operation mode of the femtocell base station 110 is maintained in the current state in step S327.

If it is determined that the communication resources assigned to the femtocell base station 110 can be shared with non-subscriber terminals, the operation mode of the femtocell base station 110 is changed to the mixed user access mode in step S311.

Thereafter, in step S313, it is checked whether there is any non-subscriber terminal connected to the femtocell base station 110.

If the non-subscriber terminal 114 is connected to the femtocell base station 110, it is determined whether QoS required by the subscriber terminal 112 connected to the femtocell base station 110 can be met in step S315. If it is determined that the QoS required by the subscriber terminal 112 cannot be met, the operation mode of the femtocell base station 110 is changed to the closed user access mode in step S323.

If it is determined that the QoS required by the subscriber terminal 112 can be met, it is determined whether communication resources assigned to the femtocell base station 110 can be shared with the non-subscriber terminal 114 in step S317. If it is determined that communication resources can be shared, the procedure of the present invention returns back to step S313 to determine whether there is any non-subscriber terminal connected to the femtocell base station 110.

If it is determined that the communication resources cannot be shared, the non-subscriber terminal 114 connected to the femtocell base station 110 is made to perform handover in step S319, and the operation mode of the femtocell base station 110 is changed to the closed user access mode in step S323.

Meanwhile, if there is no non-subscriber terminal connected to the femtocell base station 110, it is determined whether or not there is any subscriber terminal connected to the femtocell base station 110 in step S321.

If the subscriber terminal 112 is connected to the femtocell base station 110, the operation mode of the femtocell base station 110 is changed to the closed user access mode in step S323.

If there is no subscriber terminal connected to the femtocell base station 110, the operation mode of the femtocell base station 110 is transited to the idle state in step S325.

Figure 4:
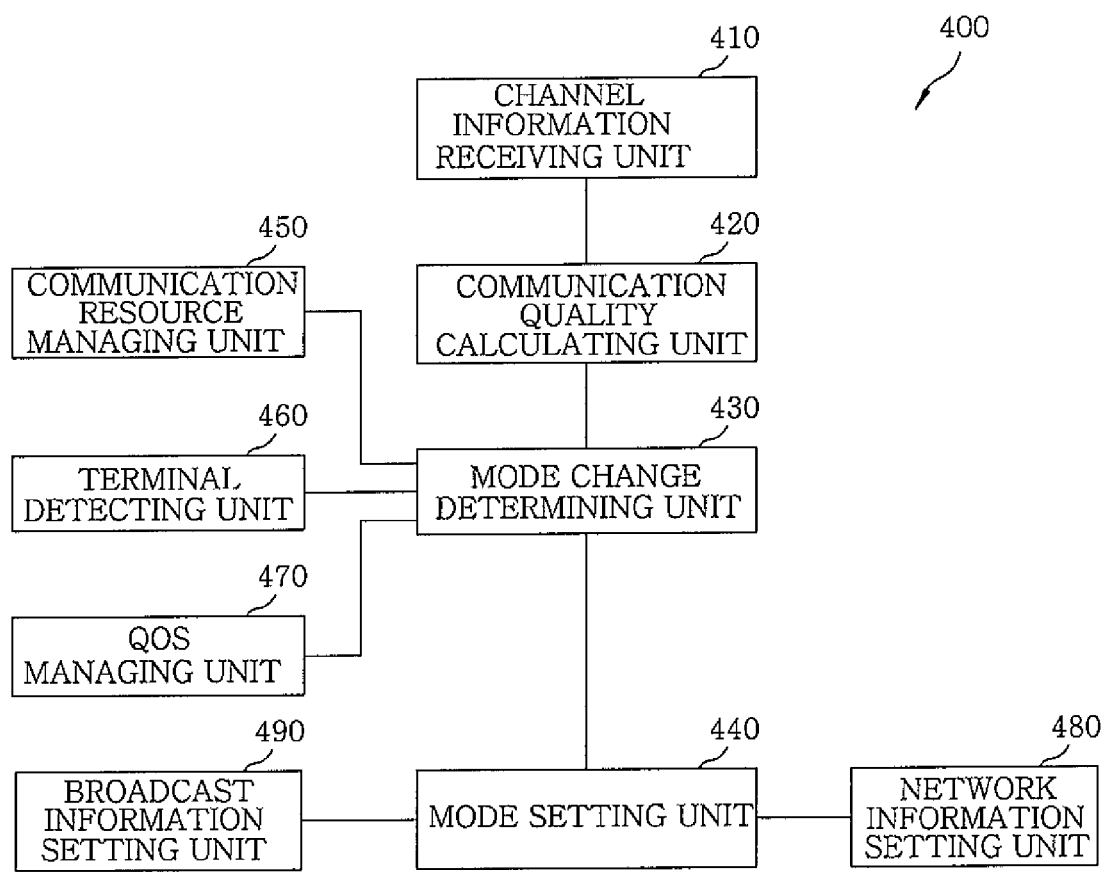
FIG. 4 is a block diagram illustrating a configuration of an apparatus for controlling an operation mode of a femtocell base station in accordance with the embodiment of the present invention.

FIG. 4 is a block diagram illustrating a configuration of an apparatus for controlling an operation mode of a femtocell base station in accordance with the embodiment of the present invention.

An apparatus 400 for controlling an operation mode of a femtocell base station shown in FIG. 4 may include a channel information receiving unit 410 for receiving CQI of a downlink channel between the femtocell base station and a terminal, which is transmitted from the terminal, a communication quality calculating unit 420 for calculating a communication quality between the femtocell base station and the terminal based on the CQI, a mode change determining unit 430 for determining whether or not an interference factor has occurred in communication between the femtocell base station and the terminal based on the communication quality, and a mode setting unit 440 for changing or maintaining an operation mode of the femtocell base station based on the determination result.

In addition, the apparatus 400 may further include a communication resource managing unit 450 for managing communication resources assigned to the femtocell base station so that the mode change determination unit 430 can determine whether or not the communication resources can be shared with other terminals.

Also, the apparatus 400 may further include a terminal detecting unit 460 for detecting a terminal connected to the femtocell base station.

Furthermore, the apparatus 400 may further include a QoS managing unit 470 for managing the state of QoS so that the mode change determining unit 430 can determine whether or not QoS required by the terminal can be maintained.

Additionally, the apparatus 400 may further include a network information setting unit 480 for reporting a mode change to an OAM apparatus when the mode setting unit 440 changes the operation mode of the femtocell base station.

Furthermore, the apparatus for controlling an operation mode of the femtocell base station 400 may further include a broadcast information setting unit 490 for allowing the femtocell base station to periodically send information about the femtocell base station including its operation mode.

More specifically, the channel information receiving unit 410 receives a signal transmitted from the terminal through the uplink channel, and the communication quality calculating unit 420 can calculate the communication quality based on a magnitude of the received signal and the CQI.

That is, the communication quality calculating unit 420 can calculate the communication quality when the operation mode of the femtocell base station is changeable.

The mode setting unit 440 can change the operation mode of the femtocell base station to the mixed user access mode if the mode change determining unit determines that the interference factor has occurred during the closed user access mode of the femtocell base station.

Meanwhile, the mode change determining unit 430 determines whether or not the communication resources assigned to the femtocell base station can be shared, and the mode setting unit 440 can change or maintain the operation mode of the femtocell base station depending on the determination result and the occurrence or nonoccurrence of the interference factor. To be more specific, the mode setting unit 440 can change the operation mode of the femtocell base station to the mixed user access mode if the mode change determining unit 430 determines that the communication resources assigned to the femtocell base station can be shared during the closed user access mode of the femtocell base station.

As described above, if severe interference has occurred in the communication with the subscriber terminal connected to the femtocell base station because it is operated in the closed user access mode, normal service can be conducted between the femtocell base station and the subscriber terminal by also providing services to the non-subscriber terminals within the femtocell covered by the femtocell base station through mode change.

Meanwhile, the mode change determining unit 430 determines whether or not QoS required by the subscriber terminal connected to the femtocell base station can be maintained when the terminal detecting unit 460 detects a non-subscriber terminal connected to the femtocell base station after the operation mode of the femtocell base station is changed to the mixed user access mode. Then, the mode setting unit 440 can change the operation mode of the femtocell base station to the closed user access mode if the mode change determination unit 430 determines that the QoS cannot be maintained.

Furthermore, the mode change determining unit 430 determines whether or not communication resources assigned to the femtocell base station can be shared after the operation mode of the femtocell base station is changed to the mixed user access mode, and the mode setting unit 440 allows the non-subscriber terminal connected to the femtocell base station to perform handover and can change the operation mode of the femtocell base station to the closed user access mode if the mode change determining unit 430 determines that the communication resources cannot be shared.

Also, the mode setting unit 440 can change the operation mode of the femtocell base station to the closed user access mode when the terminal detecting unit 460 does not detect a non-subscriber terminal but detects a subscriber terminal after the operation mode of the femtocell base station is changed to the mixed user access mode.

As described above, a connection request of the subscriber terminal can be normally processed by minimizing the influence on the subscriber terminal connected to the femtocell base station even when the femtocell base station is operated in the mixed user access mode. At this time, it is designed that other terminals connected in the mixed user access mode are allowed to reduce a data transmission rate or perform handover.

In addition, the mode setting unit 440 can change the operation mode of the femtocell base station to an idle mode when the terminal detecting unit 460 does not detect any terminal after the operation mode of the femtocell base station is changed to the mixed user access mode.

As above, if there is no terminal which requests service to the femtocell base station, a transmission cycle of broadcast information sent by the femtocell base station is controlled to reduce power consumption required for wireless communication.

In accordance with the embodiment of the present invention, if it is determined that an interference factor has occurred in the communication between the femtocell base station and the terminal based on a communication quality calculated by using CQI received from the terminal, the operation mode of the femtocell base station is changed, thereby minimizing interferences between the adjacent base stations and thus efficiently providing high quality wireless communication service.

In addition, in accordance with the embodiment of the present invention, the operation mode of the femtocell base station is changed or maintained to ensure QoS required by the subscriber terminal, and is transited to an idle mode state if there is no terminal which requests service to the femtocell base station, thus reducing power required for wireless communication and improving the quality of wireless communication service.

The embodiments of the present invention can be implemented in the form of program instructions that can be executed by various computer means, and recorded in a computer-readable medium. The computer-readable recording medium include may include one or a combination of program instructions, data files, data structures, etc. This medium may be any medium so long as they are specifically designed and configured for the present invention or well-known to and available for those skilled in the art. Examples of the computer-readable recording medium include magnetic medium such as hard disk, floppy disk and magnetic tape, optical storage medium such as CD-ROM and DVD, magneto-optical medium such as floptical disk, and hardware devices, such as ROM, RAM, and flash memory, which are specifically configured to store and execute program instructions. The medium may be a transmission medium such as an optical or metal line, waveguide, or the like, including a carrier wave, which transmits a signal to designate program instructions, data structures, or the like. Examples of the program instructions include machine-language codes made by a complier as well as high-level language codes that can be executed by a computer using an interpreter, or the like.

While the invention has been shown and described with respect to the embodiments, it will be understood by those skilled in the art that various changes and modification may be made without departing from the scope of the invention as defined in the following claims.

What is claimed is:

1. A method for controlling an operation mode of a femtocell base station, the method comprising:
    receiving a channel quality indicator of a downlink channel between the femtocell base station and a terminal, which is transmitted from the terminal;
    calculating a communication quality between the femtocell base station and the terminal based on the channel quality indicator;
    determining whether or not an interference factor has occurred in communication between the femtocell base station and the terminal based on the communication quality; and
    changing or maintaining an operation mode of the femtocell base station based on the determination result,
    wherein the changing or maintaining the operation mode includes changing the operation mode of the femtocell base station to a mixed user access mode when it is determined that the interference factor has occurred during a closed user access mode of the femtocell base station,
    wherein the mixed user access mode provides closed subscriber group (CSG) subscribers with a closed type service, and CSG non-subscribers with an open type service to offer differentiated services to each group; and
    after the changing or maintaining the operation mode:
        determining whether or not a service quality required by a subscriber terminal connected to the femtocell base station is met when a non-subscriber terminal is connected to the femtocell base station;
        changing the operation mode of the femtocell base station to the closed user access mode when it is determined that the service quality is not met;
        determining whether or not a communication resource assigned to the femtocell base station is allowed to be shared when the non subscriber terminal is connected to the cell base station; and
        when it is determined that the communication resource is not allowed to be shared, allowing the non-subscriber terminal to perform a handover and changing the operation mode of the femtocell base station to the closed user access mode.

2. The method of claim 1, wherein the communication quality is calculated when the operation mode of the femtocell base station is allowed to be changed.

3. The method of claim 1, wherein the communication quality is calculated based on the channel quality indicator and a magnitude of a signal transmitted from the terminal through an uplink channel.

4. The method of claim 1, further comprising, before said changing or maintaining an operation mode:
    determining whether or not a communication resource assigned to the femtocell base station is allowed to be shared, wherein the operation mode of the femtocell base station is changed or maintained based on the determination result as to whether or not the interference factor has occurred, and the determination result as to whether or not the communication resources is allowed to be shared.

5. The method of claim 4, wherein said changing or maintaining an operation mode includes changing the operation mode of the femtocell base station to a mixed user access mode if it is determined that the interference factor has occurred during a closed user access mode of the femtocell base station and that the communication resources is allowed to be shared.

6. The method of claim 1, further comprising, after said changing or maintaining an operation mode:
   determining whether or not a service quality required by a subscriber terminal connected to the femtocell base station is met when a non-subscriber terminal is connected to the femtocell base station; and
   changing the operation mode of the femtocell base station to a closed user access mode if it is determined that the service quality is not met.

7. The method of claim 1, further comprising, after said changing or maintaining an operation mode:
   changing the operation mode of the femtocell base station to the closed user access mode when the non-subscriber terminal is not connected to the femtocell base station but the subscriber terminal is connected to the femtocell base station.

8. The method of claim 1, further comprising, after said changing or maintaining an operation mode:
   changing the operation mode of the femtocell base station to an idle mode when there is no terminal connected to the femtocell base station.

9. An apparatus controlling an operation mode of a femtocell base station, the apparatus comprising:
   a channel information receiving unit receiving a channel quality indicator of a downlink channel between the femtocell base station and a terminal, which is transmitted from the terminal;
   a communication quality calculating unit calculating a communication quality between the femtocell base station and the terminal based on the channel quality indicator;
   a mode change determining unit determining whether or not an interference factor has occurred in communication between the femtocell base station and the terminal based on the communication quality; and
   a mode setting unit changing or maintaining an operation mode of the femtocell base station based on the determination result,
   wherein the mode setting unit changes the operation mode of the femtocell base station to a mixed user access mode if the mode change determining unit determines that the interference factor has occurred during a closed user access mode of the femtocell base station,
   wherein the mixed user access mode provides closed subscriber group (CSG) subscribers with a closed type service, and CSG non-subscribers with an open type service to offer differentiated services to each group;
   a terminal detecting unit detecting when the terminal is connected to the femtocell base station,
   wherein the mode change determining unit determines, after the operation mode of the femtocell base station is changed to the mixed user access mode, whether or not a service quality required by a subscriber terminal connected to the femtocell base station is met when the terminal detecting unit detects a non-subscriber terminal connected to the femtocell base station, and
   wherein the mode setting unit changes the operation mode of the femtocell base station to the closed user access mode when the mode change determining unit determines that the service quality is not met,
   wherein the mode change determining unit determines whether or not a communication resource assigned to the femtocell base station is allowed to be shared after the operation mode of the femtocell base station is changed to a mixed user access mode, and
   wherein the mode setting unit allows the non-subscriber terminal to perform a handover and changes the operation mode of the femtocell base station to the closed user access mode when the mode change determining unit determines that the communication resources is not allowed to be shared.

10. The apparatus of claim 9, wherein the communication quality calculating unit calculates the communication quality when the operation mode of the femtocell base station is allowed to be changed.

11. The apparatus of claim 9, wherein the channel information receiving unit receives a signal transmitted from the terminal through an uplink channel, and
    wherein the communication quality calculating unit calculates the communication quality based on a magnitude of the received signal and the channel quality indicator.

12. The apparatus of claim 9, wherein the mode change determining unit determines whether or not a communication resource assigned to the femtocell base station is allowed to be shared, and
    the mode setting unit changes or maintains the operation mode of the femtocell base station based on the determination result as to whether the interference factor has occurred, and the determination result as to whether the communication resources is allowed to be shared.

13. The apparatus of claim 12, wherein the mode setting unit changes the operation mode of the femtocell base station to a mixed user access mode if the mode change determining unit determines that the communication resources is allowed to be shared during a closed user access mode of the femtocell base station.

14. The apparatus of claim 9, further comprising:
    a terminal detecting unit detecting a terminal connected to the femtocell base station, wherein the mode change determining unit determines whether or not a service quality required by a subscriber terminal connected to the femtocell base station is met when the terminal detecting unit detects a non-subscriber terminal connected to the femtocell base station after the operation mode of the femtocell base station is changed to the mixed user access mode, and wherein the mode setting unit changes the operation mode of the femtocell base station to the closed user access mode if the mode change determining unit determines that the service quality is not met.

15. The apparatus of claim 9, further comprising:
    a terminal detecting unit detecting a terminal connected to the femtocell base station, wherein the mode setting unit changes the operation mode of the femtocell base station to the closed user access mode when the terminal detecting unit does not detect a non-subscriber terminal but detects a subscriber terminal after the operation mode of the femtocell base station is changed to the mixed user access mode.

16. The apparatus of claim 9, further comprising:

a terminal detecting unit detecting a terminal connected to the femtocell base station, wherein the mode setting unit changes the operation mode of the femtocell base station to an idle mode when the terminal detecting unit does not detect any terminal after the operation mode of the femtocell base station is changed to the mixed user access mode.

\* \* \* \* \*